United States Patent [19]

Ty et al.

[11] Patent Number: 4,726,452
[45] Date of Patent: Feb. 23, 1988

[54] FLUID FLOW CONTROL APPARATUS

[75] Inventors: Henry Ty, Attleboro, Mass.; Gerald L. McDermott, Redford, Mich.; Alfred J. White, Providence, R.I.

[73] Assignee: Texas Instruments Incorporated, Dallas, Tex.

[21] Appl. No.: 861,382

[22] Filed: May 9, 1986

Related U.S. Application Data

[63] Continuation-in-part of Ser. No. 684,219, Dec. 20, 1984, abandoned, and Ser. No. 684,220, Dec. 20, 1984, abandoned.

[51] Int. Cl.⁴ .................................................. F16F 9/52
[52] U.S. Cl. ................................ 188/277; 188/322.14; 236/93 R
[58] Field of Search ............... 188/276, 277, 278, 314, 188/315, 313, 318, 322.13, 322.15, 322.14; 236/93 R, 100, 99 F, 101 D; 137/468; 16/58

[56] References Cited

U.S. PATENT DOCUMENTS

| | | | |
|---|---|---|---|
| 1,486,381 | 3/1924 | Jaenichen | 188/278 |
| 1,798,431 | 3/1931 | McWilliams | 236/93 R |
| 1,806,530 | 5/1931 | Giesler | 236/93 R |
| 2,723,006 | 11/1955 | Wyeth | 188/277 |
| 3,006,441 | 10/1961 | Bliven et al. | 188/277 |
| 3,674,120 | 7/1972 | Johnson | 188/277 |
| 3,913,170 | 10/1975 | Nakane et al. | 188/277 X |
| 4,010,829 | 3/1977 | Naito et al. | 188/278 |
| 4,428,464 | 1/1984 | Miura | 188/315 |

*Primary Examiner*—Douglas C. Butler
*Attorney, Agent, or Firm*—John A. Haug; James P. McAndrews; Melvin Sharp

[57] ABSTRACT

A shock absorbing mechanism has a fluid filled pressure chamber with a piston mounted therein along with a restrictive orifice leading to an outer chamber. When shock is transmitted by the piston, fluid is forced through the opening against compressed gas contained in the outer chamber. The opening is formed in a movably mounted valve element normally biased against a valve seat but which is forced away from the valve seat by the fluid which had previously passed through the orifice after the force caused by the shock is abated. The size of the orifice in the valve element is controlled by a thermostatic coil mounted on the valve element. The coil is connected to a pin which pivots as the coil expands or contracts due to changes in temperature causing a flag mounted on the pin to slide over the surface of the valve element in which the orifice is formed.

16 Claims, 10 Drawing Figures

FLUID FLOW CONTROL APPARATUS

This application is a continuation-in-part of applications Ser. No. 684,219 and 684,220, both filed on Dec. 20, 1984 and each now abandoned.

This invention relates generally to valve apparatus for controlling fluid flow and more particularly to such apparatus for controlling the flow of hydraulic fluid used in shock absorbing mechanisms.

In conventional shock absorbing mechanisms such as automotive shock absorbers a force transmitting piston is mounted in an inner pressure chamber filled with hydraulic fluid. The chamber has a valve element formed with a restrictive orifice which leads to an outer chamber charged with compressed nitrogen. When a shock is transmitted by the piston to the fluid, some fluid is forced through the aperture into the outer chamber. The size of the opening, as well as the viscosity of the fluid, determines the damping effect of the mechanism. Once the shock has abated the compressed nitrogen forces the fluid against the valve element thereby lifting it from a valve seat to allow the fluid to return to the inner pressure chamber. While this has proven to be effective and reliable, a problem has existed when such devices are used in cold climates. Sine the hydraulic fluid becomes more viscous as the temperature decreases, the flow of fluid through the orifice concomitantly decreases thereby resulting in a diminution of the damping effect. That is, less shock will be absorbed in cold weather than in warm weather.

SUMMARY OF THE INVENTION

Accordingly, it is an object of the present invention to provide a valve element for a shock absorbing mechanism which will provide a more uniform damping action regardless of temperature fluctuations in the environment in which the mechanism is used.

Another object of the invention is the provision of an improved valve element which is inexpensive, reliable, of a size such that it can be placed in existing mechanisms and one which can withstand relatively turbulent, high pressure flow on opposite sides thereof.

Other objects and features of the invention will become more readily understood from the following detailed description drawings in which like reference numerals designate like parts throughout the figures thereof.

Briefly, in accordance with the invention a valve assembly comprises a movably mounted valve element biased toward a valve seat. A pivotably mounted pin is disposed in aligned bores formed in the valve element and a bracket is attached to the valve element. An orifice extends through the valve element adjacent the bore in the form of a pair of identically shaped slots, and edge of one slot forming a line, the imaginary continuation of which passes through the longitudinal axis of the pin and coincides with an edge of the other slot. Another edge of the one slot forms another line, the imaginary continuation of which passes through the longitudinal axis of the pin and coincides with another edge of the other slot. A thermostatic strip in the form of a helical coil having several convolutions has a first end fixedly connected to the pin and a second end received in a slot in the bracket.

According to a feature of the invention a flag, configured generally in the shape of a bow tie with two wings extending from opposite sides of a central hub portion is fixedly attached to the pin and is adapted to slide across the surface of the valve element to and from a position in which the orifice is uncovered and a position in which at least a portion of the orifice is covered with one wing extending over one of the slots and the other extending over the other slot.

In one embodiment the convolutions are all in alignment with one another along the longitudinal axis of the pin while in another embodiment they are spread out along the longitudinal axis of the pin in order to obtain greater pivotal motion of the pin.

BRIEF DESCRIPTION OF THE DRAWINGS

With reference to FIGS. 1 and 2, numeral 10 refers to a conventional hydraulic shock absorber mechanism comprising an inner pressure chamber 12 formed by a generally cylindrical wall 14 having a first end closed by a valve assembly 16 and a shock transmitting piston 18 adapted to slide toward and away from the first end.

Figure 2:
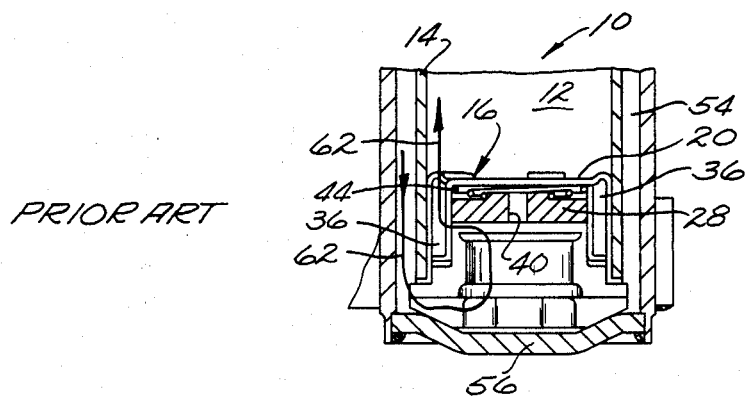
FIG. 2 is a view similar to FIG. 1 showing an end of the shock absorber in the recovery or rebound mode when fluid is being returned to the pressure chamber.
Figure 3:
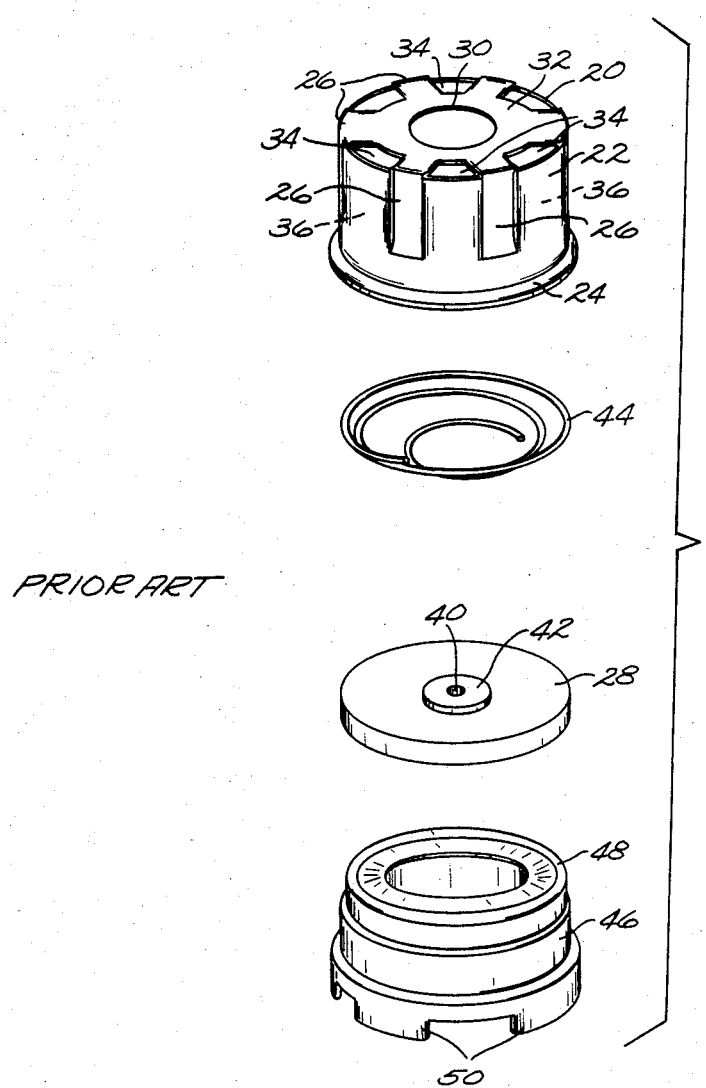
FIG. 3 is a perspective view, blown apart, of the prior art valve mechanism used in the shock absorber shown in FIGS. 1 and 2.

As best seen in FIG. 3, valve assembly 16 comprises a generally cylindrical cup shaped housing 20 having an upstanding side wall 22 which closely conforms to the inner surface of cylindrical wall 14 of the pressure chamber. Housing 20 is telescopically received in the first end of the pressure chamber with an outwardly extending flange 24 formed on the lower end of the housing abutting the lower distal end of wall 14. A plurality of inwardly extending ribs 26 are formed in side wall 22 and extend along the longitudinal axis of the housing over a portion of its length. The inner surface of the ribs form lands which serve as a guide surface for valve element 28 to be discussed below. The upper end of housing 20, as seen in the figures, has a centrally located opening 30 in end wall 32 and an opening 34 located intermediate and adjacent each of the ribs 26. Passages 36 (see FIGS. 1 and 2) are formed between adjacent ribs extending between pressure chamber 12 through aperture 34 to the interior of the housing 16.

Valve element 28 is a circular disc having a bore 40 extending therethrough from top to bottom and is shown formed with a raised platform area 42 which serves as a spring seat. Element 28 is slidingly received in housing 16 along the lands formed by the inner surface of ribs 26 with a coil spring 44 disposed intermediate end wall 32 and element 28 to provide a downward bias on element 28.

A base 46 received at the bottom end of housing 20 captures valve element 28 in the housing and is formed with an annular valve seat 48 in alignment with the outer periphery of the bottom surface of valve element 28. Base 46 is a generally tubular sleeve with a plurality of downwardly depending feet 50.

Figure 1:
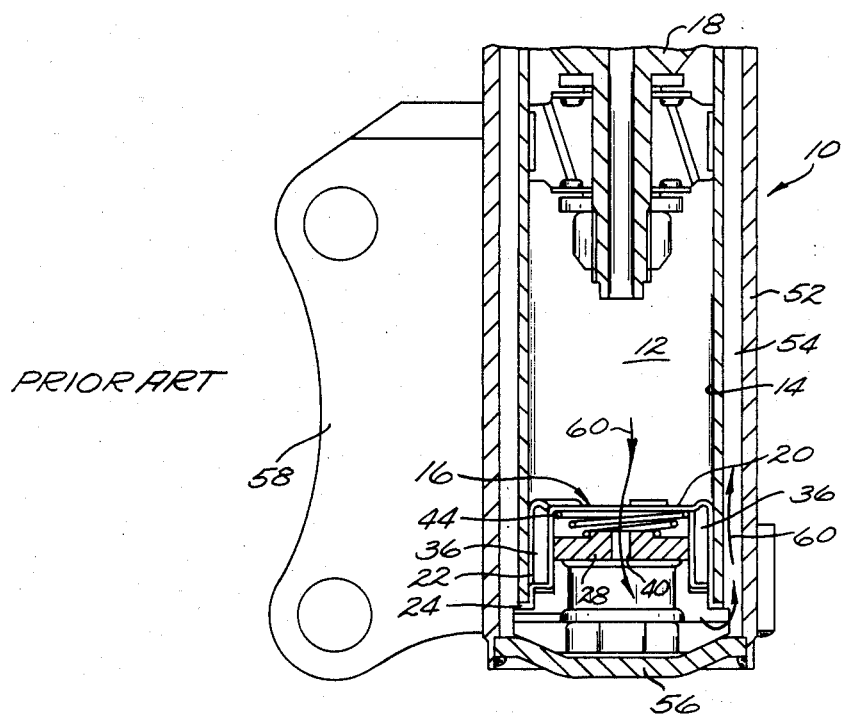
FIG. 1 is a cross sectional view of a portion of a pressure chamber of a conventional shock absorber mechanism shown in the compression mode when it is absorbing shock.

Shock absorber 10 has an outer generally cylindrical wall 52 spaced from inner wall 14 to form an outer chamber 54 which is charged with a gas, preferably nitrogen, at a selected pressure, for example 40 psi, in a known manner. An end cap 56 closes outer chamber 54 capturing valve assembly 16 as shown in FIGS. 1 and 2. A suitable mounting bracket 58 is provided to mount the shock absorber in its desired location.

With valve element 28 in its FIG. 1 position there is a fluid passage between pressure chamber 12 and outer chamber 54 which extends through opening 30 of housing 20, bore 40 of valve element 28, the center of base 46 and through the space between feet 50.

With valve element 28 in its FIG. 2 position there is a fluid passage between outer chamber 54 and pressure chamber 12 which extends through the space between feet 50, the center of base 46, around the outer periphery of valve element 28, through passage 36 and openings 34 as well as through bore 40 of valve element 28.

In its at rest position shown in FIG. 1 a selected quantity of fluid medium such as suitable hydraulic fluid is disposed in pressure chamber 12. Valve element 28 is biased into contact with valve seat 48 so that the only passage between the inner and outer chambers is through bore 40, the diameter of which is selected to provide a desired damping effect based on the viscosity of the fluid medium. For example, when a shock is received via the wheels of a vehicle through piston 18, fluid is forced through bore 40 as indicated by arrows 60 into the outer chamber further compressing the nitrogen. Once the chock has been spent, the fluid medium which has passed through bore 40 now exerts sufficient force on the bottom of valve element 28 due to the compressed nitrogen to lift element 28 from the valve seat thereby permitting fluid to flow through passages 36 as indicated by arrows 62, as well as through bore 40, into chamber 12 to revert back to the at rest position.

Figure 4:
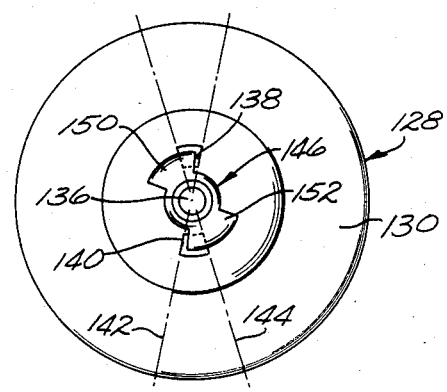
FIG. 4 is a top plan view of an improved valve element made in accordance with the invention useful in the valve mechanism shown in FIGS. 1-3.
Figure 5:
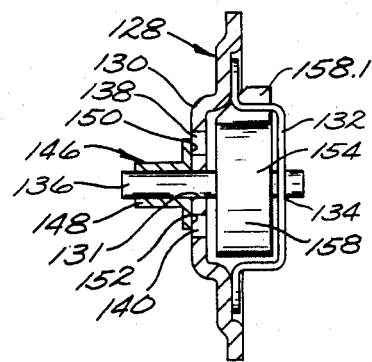
FIG. 5. is a cross sectional side view of the FIG. 4 valve element.
Figure 6:
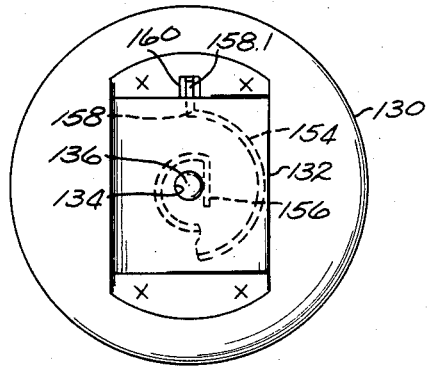
FIG. 6 is a bottom plan view of the FIG. 4 valve element.

In order to provide a more uniform damping action in variable temperature environments, an improved valve element 128 is shown in FIGS. 4-6 according to a first embodiment of the invention. Valve element 128 has a generally circular base plate or control wall 130 the outer periphery of which is adapted to move into and out of engagement with valve seat 48 in the same manner as valve element 28. Control wall 130 has a centrally located bore 131 extending therethrough and has a bracket 132 welded to the bottom surface on opposite sides of bore 131. Bracket 132 is generally U-shaped so that the bight portion extending across bore 131 is spaced therefrom forming a sensor cavity between the bracket and the control wall. A bore 134 is formed in bracket 132 in alignment with bore 131 in control wall 130 and a shaft or pin 136 is rotatably mounted in the two bores.

An orifice is formed in control wall 130 preferably in the form of a pair of similarly configured slots 138, 140 disposed adjacent to and on opposite sides of bore 131. A first edge of slot 138 forms a straight line the imaginary continuation of which passes through the longitudinal axis of pin 136 and coincides with an edge of slot 140 as indicated by center line 142 on FIG. 4. A second edge of slot 138 forms a straight line the imaginary continuation of which passes through the longitudinal axis of pin 136 and coincides with another edge of slot 140 as indicated by center line 144.

A flag element 146 configured generally in the shape of a bow tie has a central hub portion 148 and a pair of diametrically opposed wings 150, 152 extending therefrom. Hub portion 148 is bored and receives pin 136 therein and is fixedly attached to the pin in any suitable manner, as by welding or brazing. The wings of flag 146 are adapted to slide over the surface of control wall 130 as pin 136 pivots.

As seen in FIG. 4, wings 150, 152 are adapted to move out of alignment with respective slots 138, 140 through a counterclockwise rotation of pin 136 to thereby give a maximum orifice size. A slight clockwise movement as seen in the Figure will result in a minimum orifice size with all but the outer peripheral portion of the slots covered by the wings 150, 152.

Also attached to pin 136 is a thermostatic element 154 used to control the angular position of pin 136 and concomitantly flag 146. Thermostatic element 154 is in the form of a spiral coil having several convolutions in alignment with one another along the longitudinal axis of pin 136 in order to use a minimum amount of space. A first inner end 156 is fixedly attached to pin 136 in a suitable manner, as by welding, and a second outer end 158 is fixedly mounted to bracket 132 with regard to its angular position by inserting end 158 through a slot 160 in bracket 132 to thereby capture it but in a way that permits the outer end (see flat tab portion 158.1 in FIGS. 5 and 6) to move inwardly and outwardly in a radial direction in slot 160. If the movement of the outer tab were restrained, then the convolutions of the coil would be pushed into contact with one another resulting in erratic, unpredictable rotational movement of pin 136. However, allowing the outer end to move outwardly as the coil expands with increased temperature obviates any frictional binding of the convolutions and provides consistent, predictable rotation of the flag elements which is uniform from device to device.

Thus at temperatures above a selected level, for example 90° F., the thermostat metal will cause the pin and flag to pivot so that wings 150, 152 are in alignment with the slots to provide a desired minimum orifice equivalent in size to that of bore 40 in valve element 28. That is, wings 150, 152 extend a lesser distance from pin 136 that the distance of the outer edge of slots 138, 140. Wings 150, 152 are sufficiently wider than slots 138, 140 to accommodate the degree of rotation of pin 136 caused by exposing the thermostat metal to the higher portion of the temperature range to which the device will be subjected; that is, for example, from 90° F. to 200° F. However, at temperatures below 90° F. the total size of the orifice will increase by movement of thermostat metal 154 causing wings 150, 152 to move out of alignment with respective slots 138, 140 until at a selected lower temperature value, e.g. 20° F., the orifice will be at a maximum size and will stay fully opened down to a level below the expected temperature range to which the device will be subjected, e.g. −50° F. By way of example, as shown in FIG. 4 the orifice of a device made in accordance with the invention is for 75° F.

Thus as temperature decreases below a level selected based on the viscosity of the fluid used and its change with temperature the size of the orifice enlarges so that generally the same degree of damping is obtained by the passage of fluid through the orifice when piston 18 is subjected to a shock.

For another showing of a thermostatically regulated orifice reference may be had to coassigned, copending application Ser. No. 518,493, filed July 29, 1983, now U.S. Pat. No. 4,502,627, which issued Mar. 5, 1985. In that application a flag adapted to slide over an orifice is mounted on the end of a cantilever mounted strip of thermostat metal.

Figure 7:
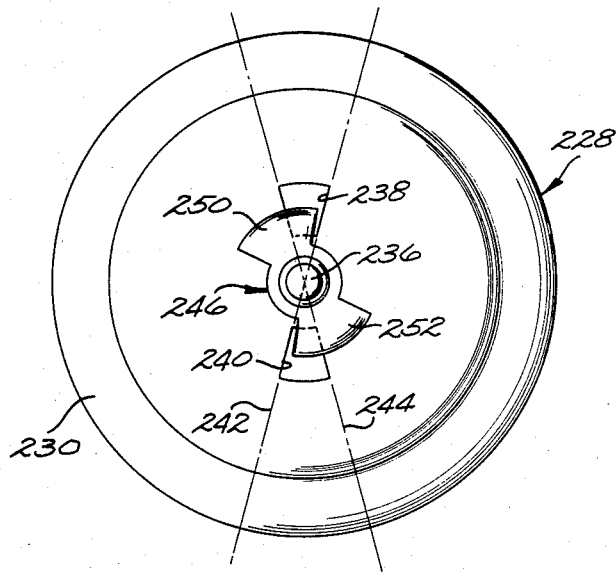
FIG. 7 is a top plan view of an alternate valve element made in accordance with the invention useful in other pressure chambers having more room along the longitudinal axis and in which more pivotable motion is desired.
Figure 8:
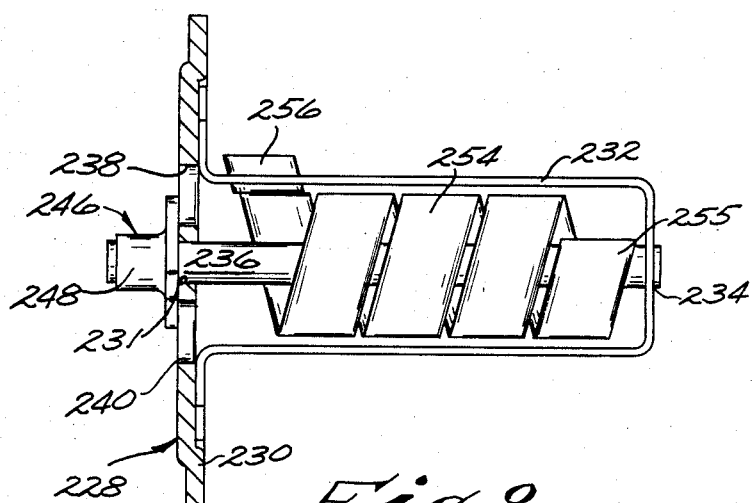
FIG. 8 is a cross sectional side view of the FIG. 7 valve element.

In the FIGS. 4–6 embodiment the use of space along the longitudinal axis is minimized by aligning all the convolutions of the spiral on the longitudinal axis. In an alternate embodiment of the sensor shown in FIGS. 7 and 8 the use of space in the radial direction is minimized by spreading out the convolutions of the thermostat metal along the longitudinal axis so that a given length of metal providing a selected degree of rotation can be placed in a smaller cylindrical housing. The spatial requirements of a particular application will dictate which embodiment will be employed. With reference to FIGS. 7 and 8, valve element 228 has a generally circular control wall 230 with a centrally located bore 231 extending therethrough. A bracket 232 is welded to a surface of wall 230 on opposite sides of bore 231. As in the FIG. 4–6 embodiment, the bracket is generally U-shaped to provide a sensor cavity between the bracket and the control wall however the legs are sufficiently long to space the bight portion far enough away from the control wall to accommodate the selected thermostat metal coil. A bore 235 is formed in bracket 232 in alignment with bore 231 and an elongated shaft or pin 236 is rotatably mounted in the two bores.

An orifice is formed in control wall 230 preferably in the form of a pair of similarly configured slots 238, 240 disposed adjacent to and on opposite sides of bore 231. A first edge of slot 238 forms a straight line, the imaginary continuation of which passes through the longitudinal axis of pin 236 and coincides with an edge of slot 240 as indicated by center line 242 in FIG. 7. A second edge of slot 238 forms a straight line, the imaginary continuation of which also passes through the longitudinal axis of pin 236 and coincides with another edge of slot 240 as indicated by center line 244.

A flag element 246, similar to element 146 of FIGS. 4–6, has a bored central hub portion 248 fixedly mounted on pin 236 and a pair of diametrically opposed wings 250, 252 extending therefrom. Wings 250, 252 are adapted to slide over the surface of control wall 230 as pin 236 pivots. Thermostat metal strip 254 has a first end 255 fixedly attached, as by welding, to pin 236 near the bight of bracket 232 and a second end 256, as in the FIG. 4–6 embodiment with regard to its angular position, captured in a slot in one of the legs of bracket 232. End 256 can slide inwardly and outwardly in a radial direction in the slot thereby minimizing torsional forces on strip 254 and bending forces on pin 236 which, if motion of end 256 were restrained, would change the frictional forces acting on flag 246 and adversley affect the consistent and predictable rotation of the flag. The particular length of the legs of U-shaped bracket 232 are chosen to accommodate the selected length of thermostat metal strips 254 which is configured into a plurality of convolutions having generally the same outside diameter but spread out along the longitudinal axis of pin 236 to form a helix.

Figure 9:
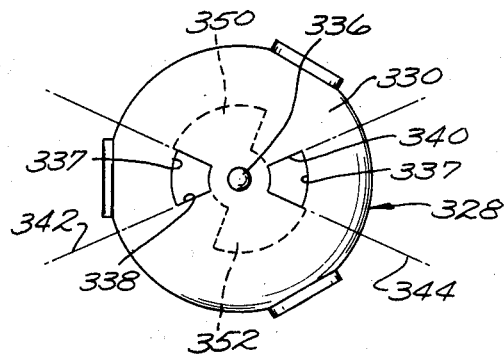
FIG. 9 is a view similar to FIG. 7 of another alternative embodiment of a valve element made in accordance with the invention.
Figure 10:
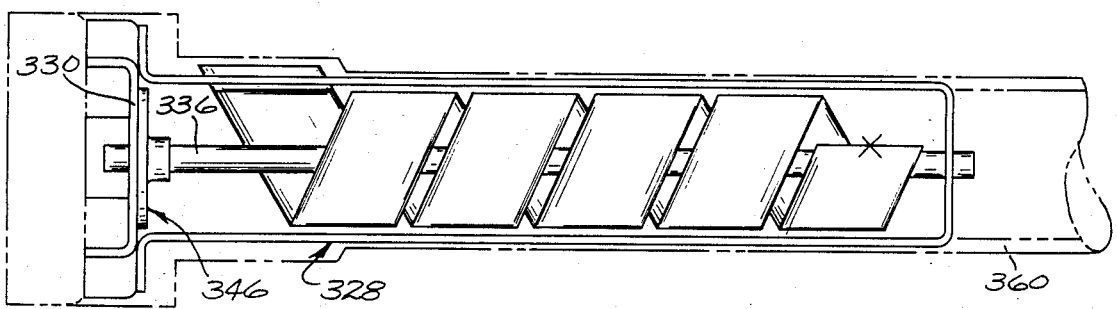
FIG. 10 is a cross sectional side view of the FIG. 9 valve element.

In FIGS. 9 and 10 is shown a modification of the invention in which the flag element 346 is used to regulate the size of the orifice in control wall 330 from fully open to a fully closed condition. That is, wings 350, 353 extend radially from pin 336 a distance greater than the outer edge 337 of slots 338, 340. Element 328 is also shown to be mounted as a stationary member with the valve function being performed entirely by flag 346. As in the previous embodiments, the slots are defined by edges which coincide with centerlines 342 and 344 passing through the longitudinal axis of pin 336.

Although the invention has been described with respect to specific preferred embodiments thereof, many variations and modifications will become apparent to those skilled in the art. It is the intent that the appended claims be interpreted as broadly as possible in view of the prior art to include all such variations and modifications.

What is claimed is:

1. A shock absorbing mechanism comprising a generally cylindrical pressure chamber having a first end with a force transmitting piston slidably received in the chamber and adapted to slide toward and away from the first end, a fluid medium received in the pressure chamber, a second chamber in communication with the first end of the pressure chamber, a valve housing disposed at the first end of the pressure chamber separating the pressure chamber from the second chamber, the housing having a generally circular valve seat and having passages leading from the valve seat into the pressure chamber, a valve element having a fluid control wall mounted in the housing and adapted to move toward and away from the valve seat, means biasing the valve element toward the valve seat, the valve element closing the passages when the valve element is seated on the valve seat, a bore extending through the control wall, a bracket attached to the valve element spaced from and extending over the bore, a bore extending through the bracket in alignment with the bore in the control wall, a pivotably mounted pin extending through the bores, a thermostatic strip formed into a coil having a first end connected to the pin and a second outer end slidably connected to the bracket so that a change in temperature will cause pivotable movement of the pin, the slidable connection of the second end of the coil to the bracket allowing the second end to move in and out in a radial direction as the coil moves with changes in temperature, the control wall formed with an orifice adjacent the bore in the control wall extending from one side of the control wall to an opposite side of the control wall so that the orifice communicates with the pressure chamber on the one side of the control wall and the second chamber on the opposite side of the control wall, a flag mounted on the pin and adapted to pivot with the pin, the flag adapted to slide on the control wall from a position in which the flag is in alignment with at least a portion of the orifice to a position in which the flag is completely out of alignment with the orifice, whereby a shock force received by the piston will force fluid medium through the orifice whose effective size changes with temperature, and pressure means in the second chamber adapted to move the valve element away from the valve seat following the transmission of shock to allow fluid medium to pass by the valve seat through the passages back into the pressure chamber.

2. A shock absorbing mechanism according to claim 1 in which the orifice adjacent the bore in the control wall is formed by a pair of slots on opposite sides of the bore in the control wall.

3. A shock absorbing mechanism according to claim 2 in which an edge of one slot of the pair extends in a line the imaginary continuation of which passes through the longitudinal axis of the pin and coincides with an edge of the other slot of the pair and a second edge of the one slot extends in another line the imaginary continuation of which passes through the longitudinal axis of the pin and coincides with another edge of the other slot.

4. A shock absorbing mechanism according to claim 3 in which the flag comprises a hub portion affixed to the pin and a pair of wings extending radially from the hub on opposite sides of the pin.

5. A shock absorbing mechanism according to claim 4 in which the slots extend in a radial direction a first distance and the wings extend in a radial direction a second distance with the second distance being less than the first distance.

6. A shock absorbing mechanism according to claim 1 in which the bracket is formed with a slot and the second end of the coil is formed with a flat radially extending tab portion which extends through and is captured in the slot.

7. A shock absorbing mechanism according to claim 1 in which the coil is formed of several convolutions in alignment with one another with respect to the longitudinal axis of the pin.

8. A shock absorbing mechanism according to claim 1 in which the bracket is formed with a slot and the second end of the coil extends through and is captured in the slot.

9. Valve apparatus comprising a valve element having a control wall, a bore extending through the control wall, a bracket attached to the valve element spaced from and extending over the bore, a bore extending through the bracket in alignment with the bore in the control wall, a pivotably mounted pin extending through the bores, a thermostatic strip formed into a coil having a first end connected to the pin and a second end formed with a flat radially extending tab portion slidably connected to the bracket so that a change in temperature will cause pivotal movement of the pin, the slidable connection of the second end of the coil to the bracket allowing the second end to move in and out in a radial direction as the coil moves with changes in temperature, the control wall formed with an orifice adjacent the bore in the control wall extending from one side of the control wall to an opposite side of the control wall, a flag mounted on the pin and adapted to pivot with the pin, the flag adapted to slide on the surface of the control wall from a position in which the flag is in alignment with at least a portion of the orifice to a postion in which the flag is completely out of alignment with the orifice, the effective size of the orifice changing with temperature between selected minimum and maximum temperatures.

10. Valve apparatus according to claim 9 in which the orifice adjacent the bore in the control wall is formed by a pair of slots on opposite sides of the bore in the control wall.

11. Valve apparatus according to claim 10 in which an edge of one slot of the pair extends in a line the imaginary continuation of which passes through the longitudinal axis of the pin and coincides with an edge of the other slot of the pair and a second edge of the one slot extends in another line the imaginary continuation of which passes through the longitudinal axis of the pin and coincides with another edge of the other slot.

12. Valve apparatus according to claim 11 in which the flag comprises a hub portion affixed to the pin and a pair of wings extending radially from the hub on opposite sides of the pin.

13. Valve apparatus according to claim 12 in which the slots extend in a radial direction a first distance and the wings extend in a radial direction a second distance with the second distance being less than the first distance.

14. Valve apparatus according to claim 9 in which the bracket is formed with a slot and the second end of the coil extends through and is captured in the slot.

15. Valve apparatus according to claim 9 in which the coil is formed of several convolutions in alignment with one another with respect to the longitudinal axis of the pin.

16. Valve apparatus according to claim 9 in which the coil is formed of several convolutions of thermostat metal with the outer diameter of the convolutions having approximately the same outer diameter and the convolutions being spread out along the longitudinal axis of the pin.

* * * * *